April 11, 1950     J. C. WILSON     2,503,646
APPARATUS FOR DRESSING A GRINDING WHEEL
TO A PREDETERMINED CONFIGURATION
Filed Feb. 23, 1946     5 Sheets-Sheet 1
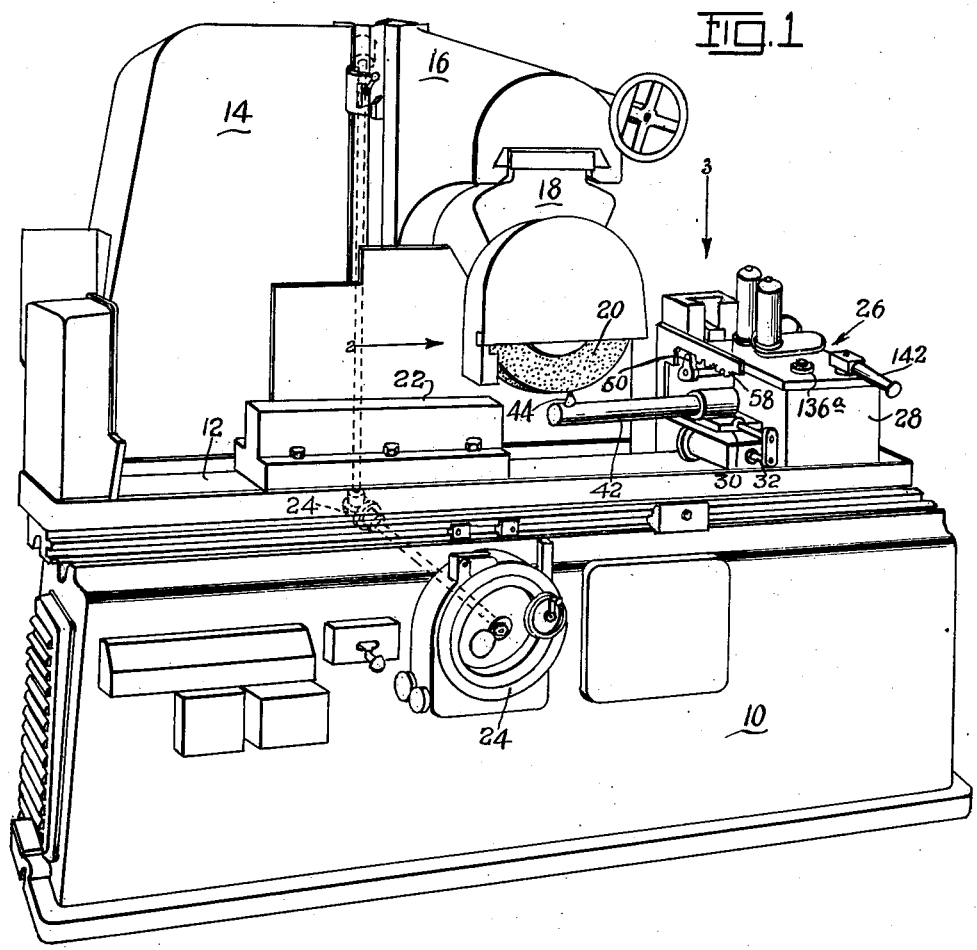
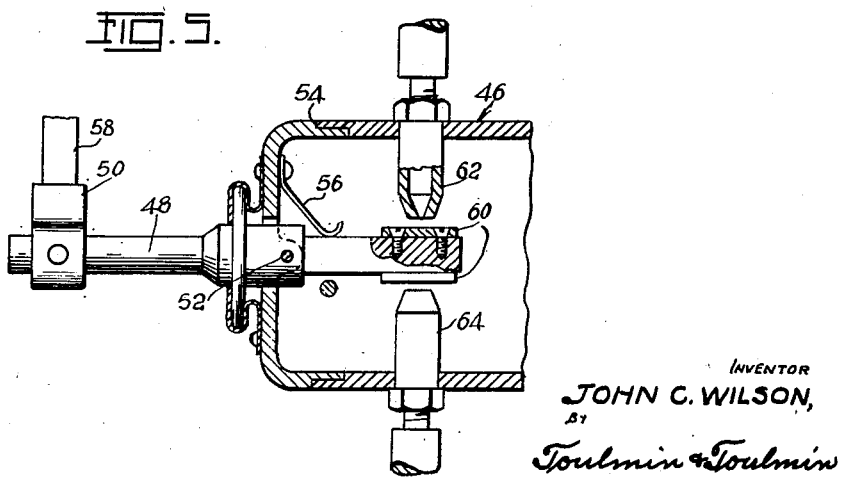
INVENTOR
JOHN C. WILSON,
BY
Toulmin & Toulmin
ATTORNEYS April 11, 1950     J. C. WILSON     2,503,646
APPARATUS FOR DRESSING A GRINDING WHEEL
TO A PREDETERMINED CONFIGURATION
Filed Feb. 23, 1946     5 Sheets-Sheet 2

INVENTOR
JOHN C. WILSON,
BY
Toulmin & Toulmin
ATTORNEYS

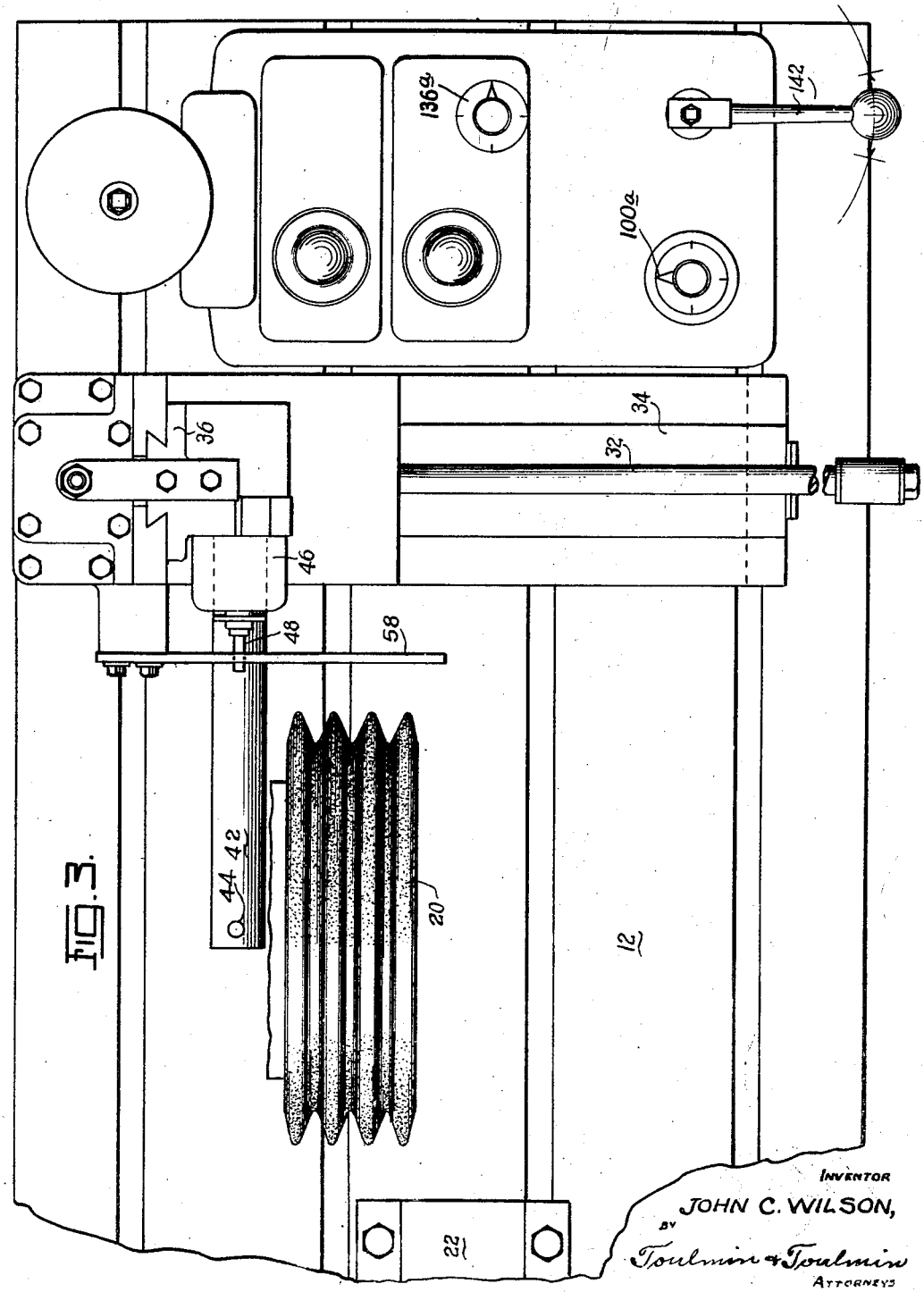

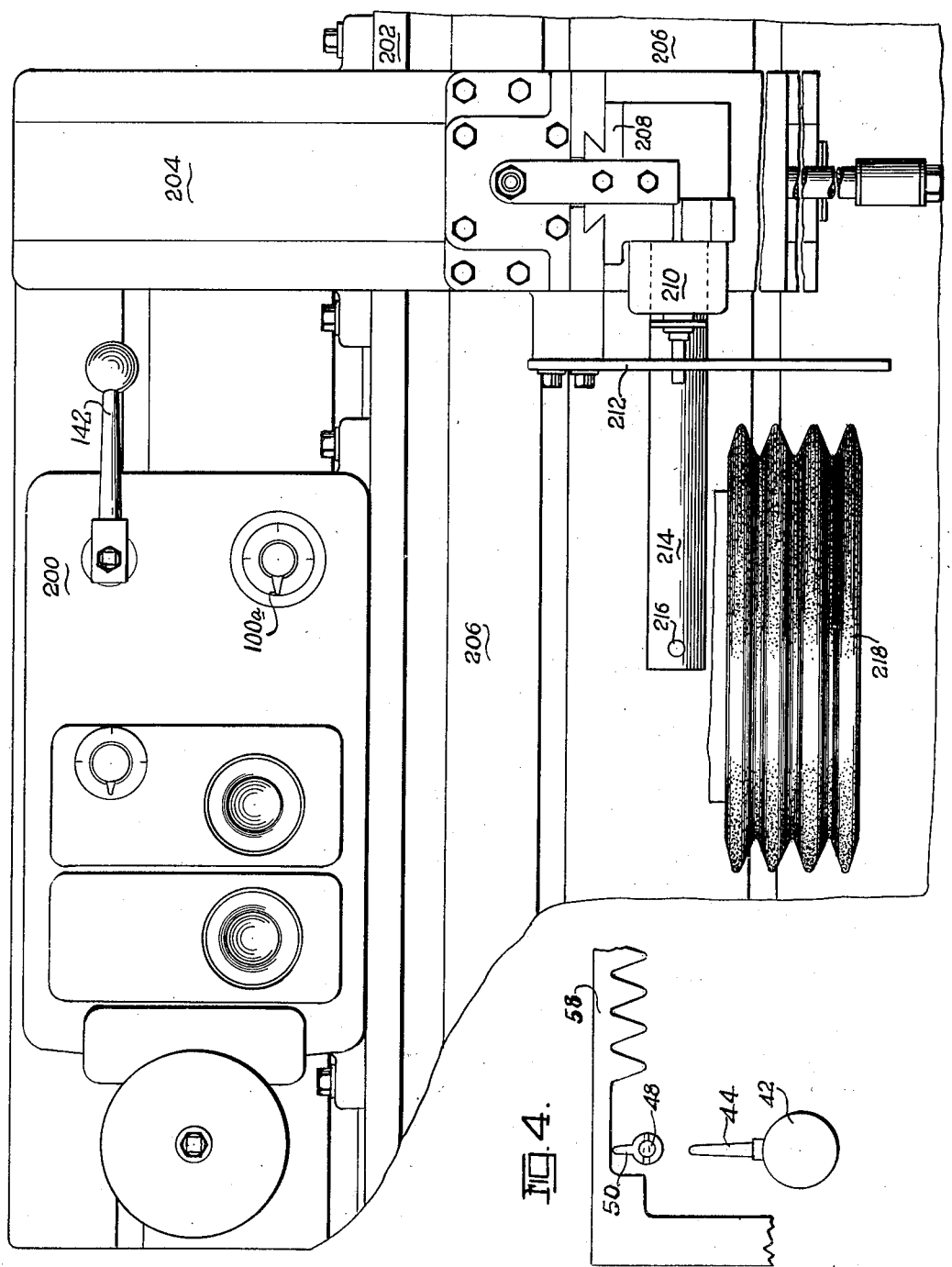

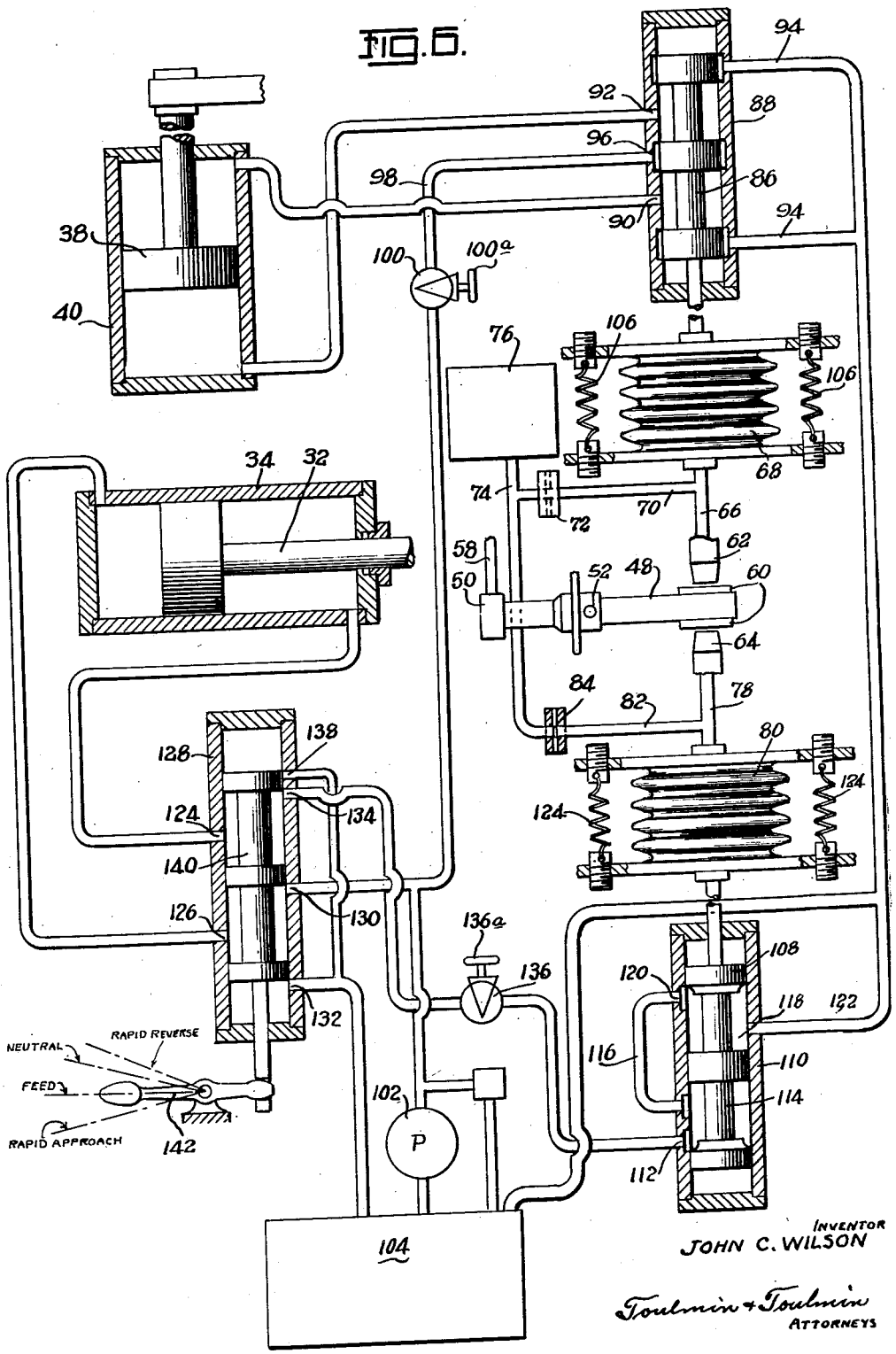

Patented Apr. 11, 1950

2,503,646

UNITED STATES PATENT OFFICE 2,503,646

APPARATUS FOR DRESSING A GRINDING WHEEL TO A PREDETERMINED CONFIGURATION

John C. Wilson, Springfield, Ohio, assignor to The Thompson Grinder Company, Springfield, Ohio, a corporation of Ohio Application February 23, 1946, Serial No. 649,466

5 Claims. (Cl. 125—11)

This invention relates to grinding machines, and particularly to an apparatus for dressing a grinding wheel to a predetermined configuration.

The particular object of this invention is to provide an improved mechanism for exactly shaping a grinding wheel for the production of precision workpieces. In the shaping of workpieces by grinding, it is necessary that the wheel be exactly shaped and that it be dressed more or less often in order to restore its configuration after it has been used for grinding. Heretofore, the shaping of a grinding wheel to any particular configuration has involved a considerable amount of apparatus which was expensive and, at best, only approximately accurate.

The present invention contemplates the use of a template and a dressing tool with servomotor means actuated by a follower for controlling the supply of power to motor means that drive the dressing tool.

By providing a template and a follower therefor and driving a servomotor mechanism or detecting means by the follower, a very accurate tracing of the template is possible. Then, through suitable amplifying equipment, the servomotor or detecting means releases power to motor means that drive the dressing tool in a path which corresponds exactly with that of the template follower.

Accordingly, another object of the present invention is to provide a grinding wheel dressing mechanism in which there is a dressing tool that is controlled by a template and template follower through suitable power amplifying means.

Another object is to provide a dressing mechanism having a diamond tracer or the like which is controlled by a template and follower through amplifying means, and in which the dressing tool can trace substantially any predetermined contour on the wheel.

The foregoing object is accomplished by traversing the wheel with the dressing tool at a predetermined rate and varying the said rate in accordance with the radial movements of the dressing tool toward and from the wheel. This permits steep cuts to be made on the wheel while maintaining substantially a constant feeding rate of the tool.

Still another object of the present invention is to provide an automatic dressing means for a grinding wheel in which the rate of dressing may be adjusted to accommodate the device to the particular type and size of wheel and to the complexity of the contour which is being formed thereon.

It is still another object to provide a grinding wheel dressing mechanism which includes a template and which may be adapted for tracing any contour on a wheel merely by replacing the template.

A further object is the provision of a unitary dressing mechanism for a grinding wheel which is adapted for being mounted on a grinding machine table or on a grinding machine bed and which requires no modification of the grinding machine structure when used in connection therewith.

These and other objects and advantages will become more apparent upon reference to the following description and accompanying drawings in which:

Figure 1 is a perspective view of a typical grinding machine having a dressing mechanism according to this invention mounted on the bed thereof;

Figure 3 is a plan view taken over the wheel and dressing mechanism looking substantially in the direction of the arrow 3 on Figure 1;

Figure 4 is a fragmentary view showing more clearly the template, template follower and dressing tool according to this invention;

Figure 5 is a view through the tracer mechanism which supports the tracer point and which is actuated by the template;

Figure 6 is a diagrammatic view of the fluid operable circuit which is controlled by the tracer mechanism and which drives the tracing tool relative to the wheel; and Figure 7 is a plan view over a grinding machine showing a dressing mechanism according to this invention secured to the grinder bed rather than the grinder table.

Figure 2:
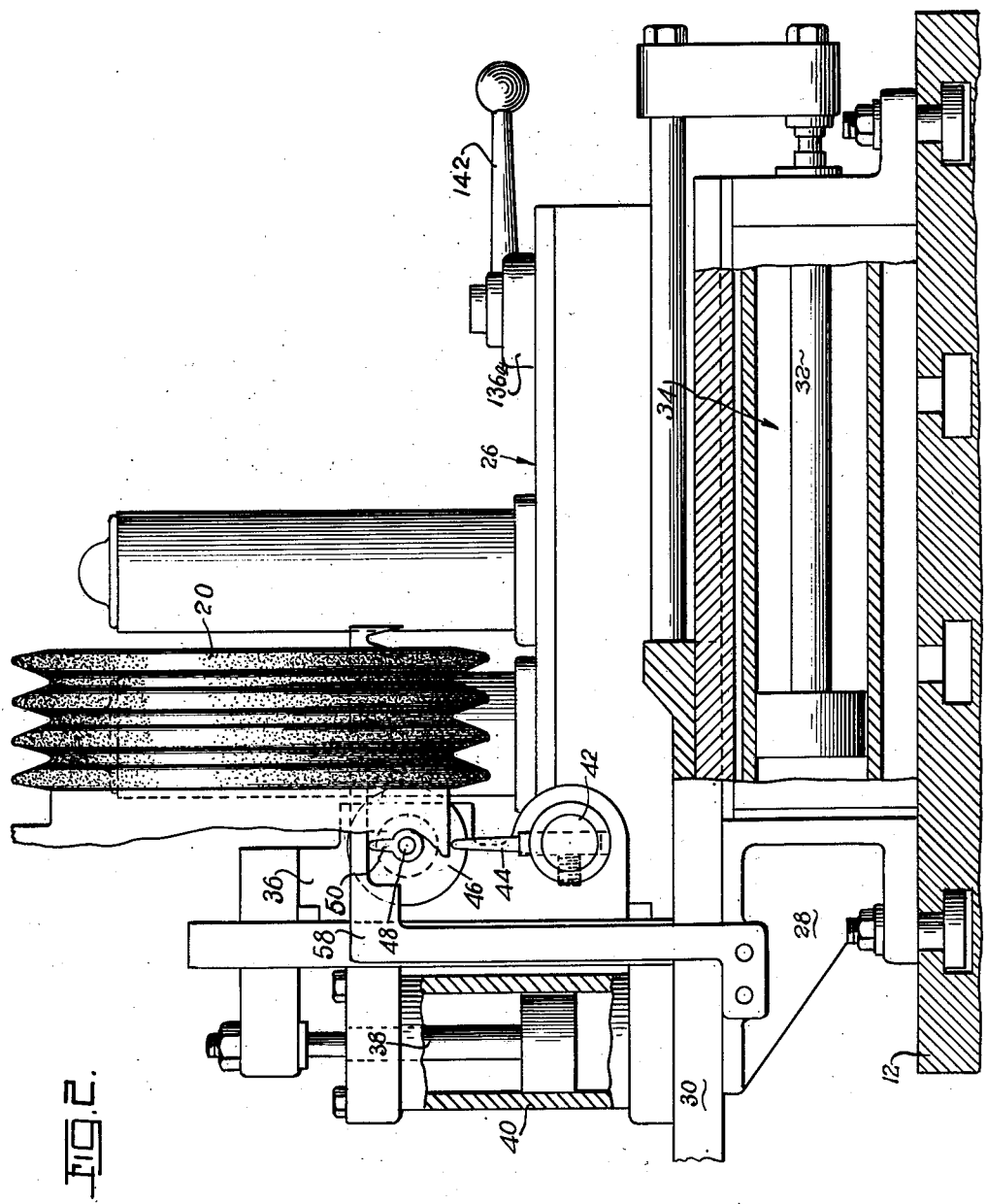
Figure 2 is a view looking longitudinally of the bed toward the wheel substantially as indicated by the arrow 2 on Figure 1 and showing the wheel and wheel dressing mechanism.

Referring to the drawings, there is illustrated in Figures 1, 2 and 3 a grinding machine having a bed 10 upon which is reciprocably mounted a workpiece supporting table 12. Adjacent to or attached to the bed 10 is a column 14 which mounts a saddle 16 for vertical reciprocation. The saddle 16 in turn supports a wheel head structure 18 for lateral reciprocation, the said wheel head structure including a drive motor and the grinding wheel mounted according to well-known practices.

The saddle 16 and, therefore, the wheel head 18 and wheel 20 may be adjusted vertically to and from the workpiece 22 by manual mechanism indicated at 24 or by any suitable power driven or automatic means. The table 12 is also preferably reciprocated by power means to traverse the wheel and workpiece relatively.

Also mounted on the bed is a dressing unit generally indicated at 26 and consisting of a housing 28 which reciprocably mounts a first slide 30 which is connected with the plunger 32 of a motor 34 carried in or on the said housing 28. The slide 30 in turn supports a mechanism suitable for guiding a second slide 36 that is connected with the plunger 38 of a motor 40 supported on the said mechanism or on the said first slide.

The second slide 36 has mounted thereon a rod 42 that supports a dressing point 44 which is preferably diamond tipped. Also carried on the slide 36 is a tracer mechanism 46, better illustrated in Figure 5, that includes a rod 48 carrying the tracer point 50. The rod 48 is pivotally mounted at 52 in the housing 54 of the tracer unit and is continuously urged about the pivot by a spring 56 to maintain the follower 50 against the template. The template, indicated at 58, is stationarily supported on a part of the housing 28 or some other suitable stationary member.

The rod 48 carries at its inner end a pair of smooth plates 60 which lie between a pair of nozzles 62 and 64. The nozzles, or orifices, discharge a fluid such as air into the space between the said nozzles and the plates 60 at a predetermined rate. Then, as the rod 48 is moved about its pivot due to the action of the template on the tracer point, the volume of fluid discharged from the nozzles is varied and, through suitable control mechanisms, actuates the motors 34 and 40 to drive the dressing tool in a path corresponding to the path of the template.

The circuit for accomplishing this is more fully shown in Figure 6 wherein it will be seen that the jet 62 is connected by a conduit 66 to an expansible bellows 68. The conduit 66 is also connected by a conduit 70 through an orifice 72 of a conduit 74 that leads to a substantially constant pressure fluid source 76. The jet 64 is similarly connected by a conduit 78 with a bellows 80 and the conduit 78 is connected by a conduit 82 through the orifice 84 with the conduit 74.

The bellows 68 is anchored at its conduit end and has connected at its other end the valve member 86. The control valve 88 has its service ports 90 and 92 connected with opposite sides of the plunger 38 of the motor 40. The valve 88 also comprises the exhaust connections 94 and the inlet port 96 is connected by a conduit 98 through an adjustable choke valve 100 with the discharge side of a pump 102 that may draw fluid from a reservoir 104.

The bellows 68 is fitted with adjustable springs 106 by means of which it may be adjusted exactly to center the valve member 86 under normal operating conditions. When the valve member 86 is exactly centered, the inlet and exhaust ports are exactly sealed off and any movement of the valve member in either direction will effect fluid communication of one side of motor 40 with the inlet and of the other side thereof with exhaust so that immediate movement of the said motor occurs when the said valve member is displaced from the position shown in the drawings.

The bellows 80 is similarly anchored at its conduit end and has its opposite end connected with the valve rod of the valve member 108 of a valve 110. The valve 110 has an inlet port or orifice at 112 that communicates with the space 114 and a conduit 116 communicates this space with a second space 118 through a port or orifice 120. The space 118 is in turn connected with exhaust through a conduit 122. The arrangement is such that movement of the valve member 108 in either direction from the position shown in the drawing effects a restriction of the passage through the valve for a purpose which will become more apparent hereinafter. The bellows 80 is fitted with adjusting mechanism as at 124 for the purpose of effecting an initial setting thereof under any predetermined conditions.

The motor 34 within which is reciprocable the plunger 32 has its opposite ends connected to the service ports 124 and 126 of a valve 128. The said valve also has an inlet port 130 connected with the discharge side of the pump 102, and an exhaust port 132 connected directly with the reservoir 104 and a second exhaust port 134 connected through an adjustable choke valve 136 with the inlet port 112 of the valve 110. A third exhaust port at 138 is also connected directly with the reservoir 104.

The valve 128 includes a valve member 140 which is movable into a plurality of positions by the lever 142 as indicated by the dot-dash lines and legends on the drawing. When the lever 142 is shifted downwardly into its "Rapid Approach" position the valve member 140 is shifted upwardly to connect the ports 126 and 130 and the ports 124 and 138. This supplies fluid to the left side of the plunger 32 while freely exhausting the right side thereof and brings about the rapid approach of the dressing tool to the grinding wheel.

When the dressing tool is near the wheel the lever 142 is shifted to its "Feed" position, which is the position shown in the drawing, and in which position the left side of the plunger 32 is supplied with pressure fluid while the right side thereof is exhausted through the port 134, the choke valve 136 and the variable throttle valve 110 to the reservoir 104. In a manner which will be explained more fully hereinafter, this position of the valve member 140 produces a controlled travel of the plunger 32.

When the lever 142 is moved into its "Neutral" position the supply of fluid to the motor 34 is interrupted and the said motor halts. The motor 34 may be reversed and the plunger 32 retracted rapidly by shifting the lever 142 into the position marked "Rapid Reverse." With the valve member in its last mentioned position, pressure fluid is supplied to the right end of the motor 34 while the left end thereof is freely exhausted to the reservoir.

In operation, assuming that the dressing tool has been brought to a position adjacent the grinding wheel and that the lever 142 has been shifted into its feed position, the dressing tool continues to approach the wheel at a rate which is determined by the setting of the choke valve 136 in the exhaust line of the motor 34. When the template follower 50 meets the first incline on the template 58, the arm 48 is rocked about its pivot point 52 in a counter-clockwise direction as viewed in the drawings. This movement of the arm 48 moves the plates 60 relative to the orifices 62 and 64 to decrease the flow from the former or permitting a greater flow from the latter.

With the flow through the orifice 62 reduced, the pressure drop across the orifice 72 is reduced and a greater pressure stands in the conduits 70 and 66, and therefore, in the bellows 68. The increase in pressure in the bellows 68 causes it to extend and to move the valve member 86 upwardly so that fluid communication is established between the ports 90 and 96 and between the port 92 and the exhaust conduit 94. With the valve member 86 so shifted the plunger 38 is driven downwardly and carries with it the slide 36, the tracing mechanism 46 and the dressing tool 44. The dressing tool thus describes an incline on the grinding wheel in exact conformity with the incline on the template.

Simultaneously, the flow through the orifice 64 is modified so that there is a greater pressure drop across the orifice 64 and a reduced pressure stands in the conduit 82 and 78 and in the bellows 80. The reduction in pressure in the bellows 80 permits it to retract and shift valve member 108 to increase the restriction to the flow of fluid through the valve 110. This effects a reduction in speed of the plunger 32 and the slide 30 connected therewith. It will be apparent that the speed of the cross travel or traverse of the dressing tool is generally inversely proportional to the rate of its in and out feeding motions because of the associated jets 62 and 64 and that, by selecting a suitable valve at 110 and a suitable bellows at 80, any contour however complex could be accurately generated on the periphery of a grinding wheel.

In order to control the cross travel or traverse rate of the dressing tool 44, the valve 136 is provided which is adjustable by means of a hand wheel 136a positioned to be available to the machine operator. Likewise, the in and out feed rate of the dressing tool may be controlled by adjustment of the knob 100a of the valve 100, this knob likewise being positioned for the convenience of the operator.

While any dressing tool sufficiently hard to cut a grinding wheel may be employed, I prefer a diamond tipped tool which is formed to a radius of between 0.010" and 0.020". It has been found that a dressing tool so shaped has substantially longer life than one with a fine point thereon or having a flat edge. A pointed or straight edged tool tends to wear into a shape which is substantially the same as that to which the dressing tool according to this invention is shaped. Accordingly, a dressing tool formed to the radius indicated has a tendency to maintain its original shape throughout its working life.

In Figure 7 there is illustrated a somewhat modified arrangement wherein the dressing mechanism 200 is attached to the rear surface of the bed 202 and has its cross travel slide 204 extended to lie over the grinder table 206. The vertically reciprocable slide 208 carries the tracer mechanism 210 that follows the template 212, the latter being stationarily mounted on the dressing mechanism or grinder bed. The slide 208 also carries the arm 214 within which is mounted the dressing tool 216 which cuts the wheel 218.

While in the form illustrated in Figure 1, the table 12 may be reciprocated to bring the dressing tool 44 directly under the wheel 20, in Figure 7 the dressing mechanism must be so located on the bed and the arm 214 must be so proportioned that the tool 216 is in alignment with the vertical center line of the wheel. Then, when the dressing attachment is idle, the slide 204 is retracted to carry the mechanism back from the wheel so that the workpiece being operated may be reciprocated thereunder.

It will be understood that this invention is susceptible to modification in order to adopt it to different usages and conditions, and accordingly, it is desired to comprehend such modifications within this invention as may fall within the scope of the appended claims.

I claim:

1. In a dressing device for dressing a grinding wheel, the combination of: a dressing tool; a pair of superposed slides supporting said tool for movement in two angularly related directions; first and second motor means respectively connected with said slides for actuating said tool in different directions in a common plane; a stationary template; a follower movably connected with said tool to be movable therewith for following said template; means for controlling the supply of actuating energy to said motors so the supply to one increases as the supply to the other decreases; and controlling means controlled by the actuation of said follower by said template in movements relative to said tool for controlling said last mentioned means, said controlling means including opposed jets rigid relative to said tool, and a baffle between said jets connected to move with said follower, one of said jets being constructed and adapted to control said first motor means and the other thereof being constructed and adapted to control said second motor means.

2. A device for dressing a grinding wheel comprising: a bed; a first slide on said bed; a second slide carried on said first slide; first and second motor means for actuating said first and second slides respectively; a template stationary relative to said bed and a follower therefor movably carried by said second slide; means controlled by movement of said follower relative to said second slide for controlling the actuation of said motor means for maintaining a predetermined relative position between said follower and said second slide; a dressing tool carried on said second slide adapted for shaping a grinding wheel; and controlling means controlled by the actuation of said follower by said template in movements relative to said tool for controlling said last mentioned means, said controlling means including opposed jets rigid relative to said tool, and a baffle between said jets connected to move with said follower, one of said jets being constructed and adapted to control said first motor means and the other thereof being constructed and adapted to control said second motor means.

3. In a grinding machine having a grinding wheel and a bed, a dressing device for dressing said grinding wheel comprising: a bed adapted for being mounted on the bed of said grinding machine; superposed slides carried on the dresser bed and individual motor means connected to said slides; a dressing tool and a template follower movably carried on one of said slides and a template which said follower follows mounted stationarily relative to said dresser bed; fluid operable means for controlling the actuation of said motor means to maintain said follower against said template, and said follower and said one of said slides in a predetermined relative position in one direction, whereby said dressing tool describes a path of the same shape as said template, said fluid operable means including: a plurality of opposed jets rigid with said one slide; a baffle member between said jets connected rigidly to said follower; conduit means connecting each jet independently to a source of fluid; an expansible member in the circuit of each jet; a valve including a movable valve member connected to said expansible member of each circuit for actuation; a fluid connection from each valve to each slide actuating motor; and a fluid connection controlling the supply of actuating energy to said motors whereby the supply to one increases as the supply to the other decreases.

4. In combination in a grinding wheel dresser; a dressing tool; superposed slides supporting said tool; first and second fluid operable motor means connected with said slides for actuating the same and said tool in directions axial and radial of the wheel; a fluid source for supplying said motor means; a variable restricting valve adapted for serial connection with said first motor means; a control valve connecting said source with said first motor means and movable into a first position to drive said first motor means at a rapid rate in one direction or, into a second position to drive said first motor means in a rapid rate in the opposite direction or, into a third position to connect said fluid source and said restricting valve serially with said first motor means; valve means controlling the supply of fluid to said second motor means for actuating it in opposite directions; a stationary template and a follower carried with said tool; fluid pressure responsive means connected with said restricting valve and with said last mentioned valve means for controlling the actuation of said first and second motor means; jets discharging to the atmosphere and hydraulically connected with said fluid pressure responsive means; means for supplying fluid at a substantially constant rate to said jets for discharge to the atmosphere therefrom; and a baffle actuated by said template follower and positioned to influence said jets oppositely.

5. In a grinding wheel dressing device for shaping grinding wheels, the combination of; superposed slides; a diamond pointed dressing tool mounted on one slide; first and second fluid operable motor means connected with said slides operable for actuating the same to move said tool in different directions in a common plane; a stationary template and a follower therefor carried with said tool; normally constant pressure opposed jets carried with said follower and discharging into the atmosphere and baffle means between said jets also carried with said follower and actuated relative to said jets by said template follower to influence said jets oppositely; fluid pressure responsive means connected to each of said jets to be varied by the variation in pressure at said jet means, valve means connected to each of said fluid pressure responsive means for controlling the direction and rate of fluid flow to each of said motor means, and means for supplying fluid to said jets for discharge therefrom.

JOHN C. WILSON.

REFERENCES CITED

The following references are of record in the file of this patent:

UNITED STATES PATENTS

| Number | Name | Date |
|---|---|---|
| 1,960,760 | Sutton | May 29, 1934 |
| 2,025,748 | Howe | Dec. 31, 1935 |
| 2,226,677 | Nikhman | Dec. 31, 1940 |
| 2,259,472 | Johnson | Oct. 21, 1941 |
| 2,335,305 | Parsons | Nov. 30, 1943 |
| 2,434,853 | Johnson | Jan. 20, 1948 |
| 2,447,478 | Rundt | Aug. 17, 1948 |
| 2,469,255 | Barnes | May 3, 1949 |